Dec. 15, 1942. C. G. LUTTS ET AL 2,304,938
STUD LINK CHAIN AND METHOD OF MAKING SAME
Filed April 15, 1941 2 Sheets-Sheet 1
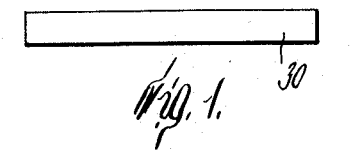
Fig. 1.
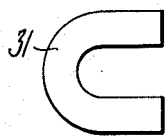
Fig. 2.
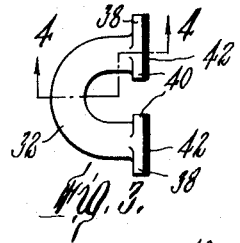
Fig. 3.
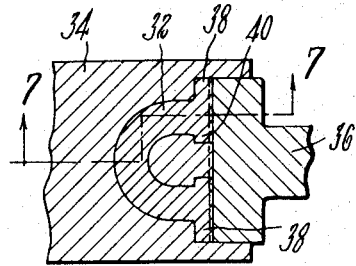
Fig. 6.
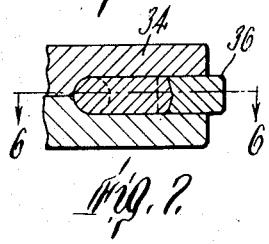
Fig. 7.
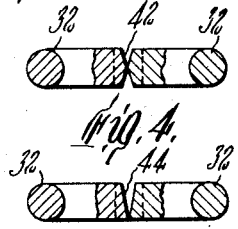
Fig. 4.
Fig. 5.
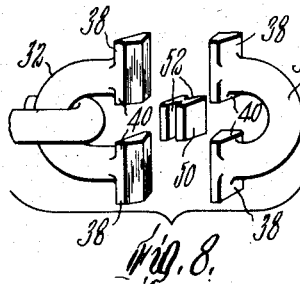
Fig. 8.
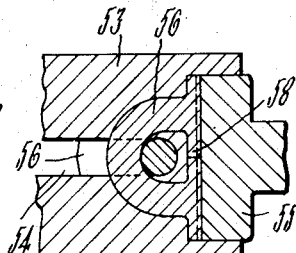
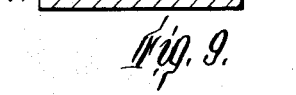
Fig. 9.
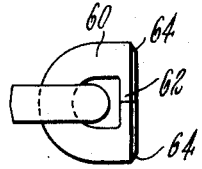
Fig. 10.
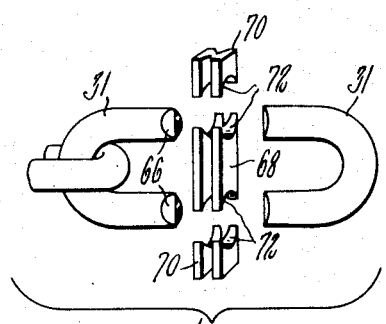
Fig. 11.
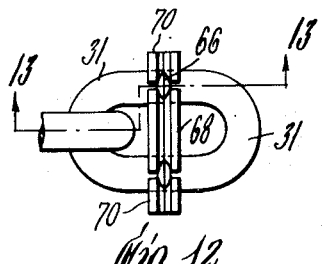
Fig. 12.
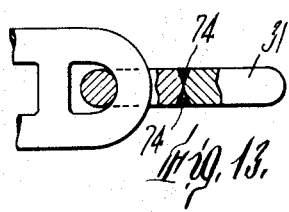
Fig. 13.
Inventors
Carlton G. Lutts
Albert M. Leahy
by Wright, Brown, Quinby May
Attys.

Dec. 15, 1942.   C. G. LUTTS ET AL   2,304,938
STUD LINK CHAIN AND METHOD OF MAKING SAME
Filed April 15, 1941   2 Sheets-Sheet 2
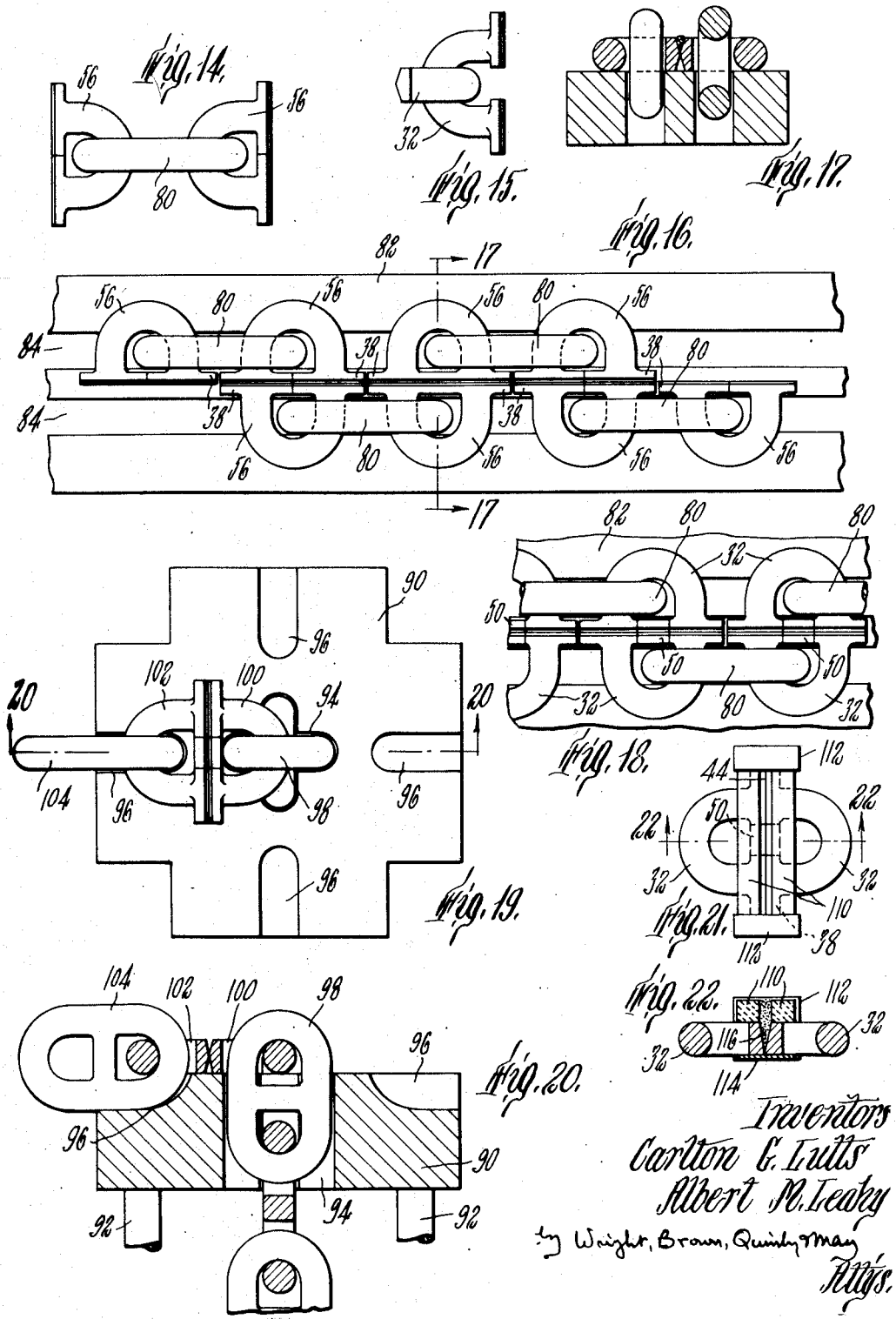

Patented Dec. 15, 1942

2,304,938

UNITED STATES PATENT OFFICE 2,304,938

STUD LINK CHAIN AND METHOD OF MAKING SAME

Carlton G. Lutts, Salem, and Albert M. Leahy, Somerville, Mass.

Application April 15, 1941, Serial No. 388,608

13 Claims. (Cl. 59—31)

This invention relates to the art of manufacturing chain cable and more particularly to the making of stud links and of cable composed of such links.

It is an object of the invention to provide a method of making chain cable which is relatively simple and inexpensive, which does not require excessive capital investment for machinery, which is rapid, which results in a high degree of uniformity in the strength of the individual links, and which lends itself to the use of automatic or semi-automatic devices so that a minimum amount of labor is required.

Heretofore several methods of chain manufacture have been employed with varying degree of advantage and success. For example, successive individual links can be forged by hand. Links can be cast of molten steel. Interfitting half-links can be forged together to interlock. Half-links can be flash-welded or resistance welded together. These methods of chain manufacture have their advantages and their disadvantages.

According to the present invention, half-links are formed having beveled end faces which, when placed in juxtaposition to the end faces of the other half-links, will form welding channels adapted to be quickly and easily filled by depositing filling metal therein through the use of an electric arc, an acetylene flame, or by chemical reaction. As hereinafter described, the half-links can thus be united together to make integral links of great strength and uniformity.

For a more complete understanding of the invention, reference may be had to the following description of various embodiments thereof, and to the illustration of such embodiments in the drawings of which Figure 1 is an elevation of a piece of bar stock for a half-link.

Figure 2 is an elevation of the same bent to U shape.

Figure 3 is an elevation of the same after the end portions of the U have been upset to form inner and outer projections and beveled end faces.

Figure 4 is a sectional view of a pair of juxtaposed half-links, the section being taken on the line 4—4 of Figure 3.

Figure 5 is a sectional view similar to Figure 4, the end faces of the links having a different kind of bevel.

Figure 6 is a section on the line 6—6 of Figure 7, showing an upsetting machine die with a half-link therein.

Figure 7 is a sectional view on the line 7—7 of Figure 6.

Figure 8 is a perspective view of a pair of half-links and an intermediate block which can be assembled into the form of a stud link with lateral projections.

Figure 9 is a fragmentary sectional view, similar to Figure 6, of an upsetting machine die having a half-link therein of modified form.

Figure 10 is an elevational view of a pair of half-links of modified form.

Figure 11 is a perspective view of a pair of half-links and other parts which can be assembled into the form of a stud link with outward projections.

Figure 12 is a plan view of a discrete link composed of the parts shown in Figure 11.

Figure 13 is a section on the line 13—13 of Figure 12.

Figure 14 is an elevation of a unit consisting of a complete link with a half-link linked to each end thereof.

Figure 15 is an elevation of doublets consisting of two half-links linked together.

Figure 16 is a fragmentary plan view of a table on which is assembled the parts of a shot of chain.

Figure 17 is a section on the line 17—17 of Figure 16.

Figure 18 is a fragmentary plan view similar to Figure 16 but showing a modified form of chain link.

Figure 19 is a plan view of a table on which can be supported links which are being added to a chain cable.

Figure 20 is a sectional view on the line 20—20 of Figure 19.

Figure 21 is a plan view of a pair of half-links arranged for chemical welding.

Figure 22 is a section on the line 22—22 of Figure 21.

According to the present invention, chain links can be made of rolled bar stock, thus utilizing the most suitable form of stock for chain manufacturer, such rolled stock having the fibers of steel longitudinally alined for maximum tensile strength. In order to make a half-link in accordance with the present invention, a cylindrical bar is cut into suitable lengths, one such length being indicated at 30 in Figure 1. The piece 30 is heated and bent by a suitable apparatus into a U-shaped form 31 as illustrated in Figure 2. The end portions of the member 31 are then heated more strongly and the member is thereupon inserted in an upsetting machine having a die comprising a body portion 34 shaped to receive the member 31, and a power plunger 36 which is adapted to strike the heated ends of the member 31 and flatten them out as indicated in Figures 3 and 6, so as to form on the ends of the half-link 32 outward projections 38 and inward projections 40, these projections all being in the plane of the U. In the half-link 32, the inward projections 40 extend toward each other but are spaced apart a distance slightly greater than the wire diameter of the bar 30 from which the half-link is made.

The end face of the plunger 36 is shaped so as to form beveled end faces 42 on the ends of the half-link. These beveled end faces are in mutual alinement as indicated in Figure 3, and may be in the form of a double bevel as shown in Figure 4 or in the form of a single bevel 44 as shown in Figure 5. In forming a whole link from two half-links of this description, a pair of half-links are presented to each other with end faces opposed as indicated in Figure 8. When the end faces of the half-links are in contact, the beveled end faces form double-V welding grooves between the ends of the half-links as indicated in Figure 4. If the bevel on the end faces extends across the entire face as at 44 in Figure 5, single-V welding grooves are formed between the pair of opposed end faces. It is to be understood that the bevel surfaces are not necessarily plane, as indicated, but may be concave so that the opposed end faces of the half-links may form a single or double U-groove, or a U-V groove, all of which are for convenience referred to herein as V-grooves. These grooves are to be filled with filler material to join the two half-links together into an integral link. Before welding, however, it is preferable to insert between the inner projections 40 of the half-links a suitable metal block 50 of substantially cubical form, each dimension being equal to the wire diameter of the stock. In two of its opposite faces this block is grooved as at 52, the grooves 52 being adapted to register with the grooves 42 when a pair of half-links are assembled. The interposition of the block 50 between the inner projections 40 produces a substantially continuous, double-V welding groove which extends across the assembled link from the extremity of one outward projection 38 to the extremity of the other outward projection, and bisects the link. Thus, when a pair of half-links of this description are assembled with a block 50 in its proper place, the metal arc-welding operation can be commenced at the extreme end of the welding groove and may progress continuously to the other end. Where the half-links form a double-V groove as indicated in Figure 4, two passes of the welding apparatus are required. To this end the half-links and block may be assembled on a horizontal surface for the first pass to fill the upper portion of the double-V groove. The link is then inverted for the second pass to fill the other portion of the welding groove. The weld permanently unites the block 50 and the half-links together into an integral link having a stud composed of the block 50 and the inward projections 40, and outward lateral projections alined with the stud. Where the end faces are beveled as shown in Figure 5 to form a single-V groove, an intermediate block with a corresponding V-groove is assembled with the pair of half-links, and a single pass of the welding apparatus is sufficient.

The beginning and ending of a line of welding are usually inferior in quality to the remainder of the weld, assuming that a uniformly good job of welding is done. Hence, for optimum results, the outward projections 38 are important since the beginning and end of the welding line which extends across the link occur in the portions of the welding groove formed by these projections. When these projections are cut off, preferably by a flame cutting apparatus, to finish the link, the inferior portions of the weld are removed, leaving nothing but the best and strongest weld throughout the entire width of the link.

Figure 9 illustrates a slightly modified form of half-link 56, this link being similar to the half-link 32 shown in Figure 3 except that the inward projections 58 are longer so that their ends abut each other. It is evident that, in order to use links of this description, they must be heated and spread to receive another link, or they must be assembled with open-ended half-links. As indicated in Figure 9, the half-links 56 may be made in pairs by hooking the open-ended U-shaped member 31 through the eye of the half-link and then inserting these two members in the upsetting die, as indicated in Figure 9, for the formation of the projections on the end portions of the U-shaped member. Doublets of this description can then be welded to one another in series to form a chain cable.

The die illustrated in Figure 9 is adapted to hold a link or half-link through which is linked the U-shaped member which is to be forged into a half-link 56. Thus the die comprises a body 53 having separable upper and lower portions as in the die 34 illustrated in Figure 7. The body 53 is provided with a slot or cavity 54 which is just wide enough to receive a link or half-link. To this end, the width of the cavity 54 must be slightly greater than the wire diameter of the work. The cavity 54 intersects the cavity in which the half-link 56 is held while it is being forged by the plunger 55.

Figure 10 illustrates another modified form of half-link 60, this half-link having no outward projections but having its inward projections 62 abutting. The end faces of the half-link form a substantially continuous surface which is preferably beveled from the center line toward the side edges and is also beveled at the ends of the face as at 64. When two such half-links are placed in juxtaposition, the bevels form a groove which extends entirely around the contour of the end faces so that the side edges of the links are welded as well as the faces of the links.

Instead of upsetting the end portions of the U-shaped half-link members 31 in order to form lateral projections thereon as hereinbefore described, the end faces of the legs of the U-shaped member 31 may be beveled as indicated at 66 in Figure 11. A double bevel may be employed as shown or a single bevel may be employed if preferred, such bevels forming either a double-V or a single-V welding groove when the half-links are brought together ends to ends. It is obviously possible to unite such half-links by welding in the grooves thus formed. In order to produce a stronger link, however, it is preferable to assemble with a pair of such half-links an intermediate block 68 which will form the stud for the link, and a pair of external blocks 70 which will provide outward lateral projections whereon the welding operation can start and finish. The blocks 68 and 70 are suitably recessed as at 72 to fit against the cylindrical surfaces of the half-links, and are also suitably grooved to register with the grooves between the exposed beveled faces 68 and thus to provide a continuous welding groove extending across the entire width of the link formed by assembling the half-links and the blocks as illustrated in Figure 12. After the welding has been completed, the outward projections 70 are cut off by a flame cutting apparatus or otherwise to finish the link. Figure 13 shows a pair of such links which have been thus finished, the welding groove having been filled as at 74 with filler metal.

The half-links and links thus far described may be assembled in various ways to make chain cable. Figure 14, for example, illustrates a unit consisting of a whole link 80 with which are linked two half-links 56. Units of this description can be welded together serially to form a chain cable of any desired length. It may be preferred to utilize machine welding for joining together a series of units in a single operation as illustrated in Figure 16. To this end, a suitable table 82 may be employed, this table having a pair of longitudinally extending grooves 84 therein. The standard length of a shot of chain cable is 90 feet. In order to assemble together on the table 82 a sufficient number of units to form a shot of chain, a table approximately 62 feet in length will be required. The units are preferably assembled on the table as illustrated in Figure 16, the whole links 80 of the units being in vertical planes with a portion of each whole link received in one or the other of the slots 84. The half-links 56 are arranged horizontally on the top surface of the table so that these half-links present their end faces to half-links of the next successive units so as to form discrete links alternating with the pre-formed whole links 80. The discrete links are arranged side-by-side on the table with the projections 38 touching. When the units are all thus assembled, a welding groove is formed which extends substantially continuously across all of the discrete links. Thus a suitable welding machine can travel along this groove continuously from one end to the other in a single operation, it being understood that in the case of a double-V groove as shown, one portion of the groove will be filled by the first pass, the assembled units then being inverted together to receive the second pass. With this arrangement of the half-links, improved welding methods can be advantageously employed to produce welds of optimum strength and uniformity. For example, a machine can be employed to heap on the groove granular material which is electrically conductive but highly resistant. The machine carries the metal electrode which plows along through this material, so that the arc is entirely shielded by the granular material. The electrode is automatically fed by the machine to maintain the proper length of arc. A small portion of the granular material adjacent to the arc melts and floats on the molten weld metal, forming a protective cover which is readily chipped off after the weld has been cooled.

After the completion of the welding, the projections 38 are cut away, finishing and separating the welded links and leaving the shot of chain cable complete and ready for use. In order to provide for proper spacing between the connecting links on the table 82, each projection 38 should be $\frac{7}{10}$ of a wire diameter in length for the formation of a cable of links of standard proportions, that is, links having an over-all length of 6 wire diameters and an over-all width of 3.6 wire diameters.

Figure 18 illustrates a table 82 on which are assembled the parts for a shot of chain, the half-links of which are of the kind illustrated in Figure 3 wherein intermediate blocks 50 are employed with the pairs of half-links to form the connecting links between the pre-formed links 80. The welding operation and cutting off of the outward projections between the links are carried out in the same manner as those for the chain cable shown in Figure 16.

A similar method of welding may be employed, if desired, in making the pre-formed links 80 which are used in units such as are illustrated in Figure 14. Instead of welding together each pair of half-links as a separate operation to form individual links, any number of pairs of half-links can be assembled to form links arranged side-by-side with their outward projections touching. This provides a welding groove extending across the entire series of links, which groove can be filled by a continuous welding operation, preferably by machine as hereinbefore described, after which the individual links are separated when the projections are cut away.

If preferred, units such as are illustrated in Figure 14, or doublets of half-links may be serially joined to form a chain cable as a progressive operation. To this end, a table such as is illustrated in Figures 19 and 20 may be conveniently employed. This table comprises a heavy top member 90 supported by suitable standards 92 and provided with a central cruciform aperture 94. Opposite each branch of the aperture 94 and spaced therefrom is a groove 96 adapted to receive and support a portion of a whole link. The chain cable is fed down through the aperture 94 as formed, the cable being supported by any suitable means (not shown) so that the last whole link 98 projects through the aperture 94 and sufficiently above the top surface of the table to permit a half-link 100 which is linked therewith to lie horizontally on the table. A corresponding half-link 102 is then placed on the table and brought into suitable juxtaposition to the half-link 100. If the half-link 102 is one of a linked pair or a member of a unit such as is illustrated in Figure 14, the other half-link or whole link 104 is supported in one of the grooves 96. The half-links 100 and 102 are thereupon united by welding as hereinbefore described. In case a double-V groove is to be filled, the upper portion of the groove is filled when the half-links 100 and 102 are lying in the position shown in Figure 19. After the completion of this portion of the welding, the link 104, together with the link formed by the united halves 100 and 102, is swung over so that the newly formed link is inverted and the pre-formed link 104 is received in the opposite slot 96. The welding operation can then be completed to fill the other portion of the welding groove. The outward projections are then cut off and the chain is lowered through the aperture 94 until the link 104 assumes the position formerly occupied by the link 98 as shown in Figure 20.

Instead of joining two half-links together by metal arc welding, chemical reaction welding may be employed in situ if preferred. Welding of this type is customarily known as "thermit" welding and consists in igniting a mixture of finely divided aluminum and a metal oxide such as an oxide of iron. The transfer of oxygen from the oxide to the aluminum generates sufficient heat to produce molten iron with a slag of aluminum oxide.

When employing this type of welding, a single V groove is preferable, as illustrated in Figures 5 and 22. Two half-links having outward projections 38 are placed in juxtaposition to form a discrete link. These links may be of the kind shown in Figure 8, in which case a central block 50 is assembled with the half-links, or may be of the kind illustrated in Figure 9, or may be of any other kind affording a continuous welding groove across the link. When members of heavy metal are to be joined by a thermit-weld, it is important that the members be preheated to redness. For economical operation, freshly forged half-links may be assembled while still hot. When two half-links are put together as shown in Figures 21 and 22, refractory bricks 110 are placed on either side of the welding groove 44 to confine the charge of thermit to the groove. The quantity of thermit required is about three times the volumetric capacity of the groove. The ends of the built-up groove are blocked by refractory bricks 112. A steel backing plate 114 is placed under the abutting edges of the half-links to congeal any molten metal which may press through the crack between these edges. A charge of thermit 116 is placed in the groove between the opposed end faces of the links and between the bricks 110, and is ignited. The reaction takes place and fills the groove 44 with molten metal, the slag floating up between the bricks. When the metal solidifies, the bricks and plate 114 are removed, the slag is knocked off, and the projections 38 are cut off.

It is evident that various modifications and changes may be made in the embodiments of the invention herein illustrated and described without departing from the spirit or scope thereof as defined in the following claims.

We claim:

1. A method of making chain links, which comprises forming a plurality of separate parts which when put together will form a stud link with outward lateral projections alined with the stud and a welding groove extending transversely across the link to the outer ends of said projections, said parts including a pair of half-links, assembling said parts together into the form of a stud link with lateral projections, welding said parts together by filling said groove with filler metal, and cutting off said projections.

2. A method of making chain links, which comprises forming a plurality of separate parts which when put together will form a stud link with outward lateral projections alined with the stud and a double-V welding groove extending transversely of the link from the extremity of one said projection to the extremity of the other, said parts including two half-links, assembling said parts together into the form of a stud link with lateral projections, welding the parts together by depositing in said groove sufficient fused filler metal to fill said groove, and cutting off said projections.

3. A method of making chain links, which comprises forming half-links having outward lateral projections at their ends and beveled end faces adapted to form a welding groove when two half-links are placed together end to end, placing said half-links together to form said groove, welding the parts together by depositing in said groove sufficient fused filler metal to fill the groove, and cutting off said outward projections.

4. A method of making chain links, which comprises forming a pair of half-links each having end portions widened to form inward and outward projections in the plane of the link, the end faces of the links being beveled to form welding grooves when the half-links are assembled together ends to ends, forming a block adapted to fit between the inward projections of the assembled half-links with a groove registering with the grooves between the ends of the half-links, assembling said half-links and block to form a stud link with outward projections, welding the parts together by depositing in the groove between the ends and in the block sufficient fused filler metal to fill the groove, and cutting off said outward projections.

5. A method of making chain links, which comprises forming a pair of half-links having end portions widened in the plane of the half-links to form inward and outward projections, the extremities of the inward projections on each link being separated by a space slightly greater than the wire diameter of the half-links, shaping the end faces of said widened end portions with a double bevel to form double-V welding grooves between said end faces when the half-links are assembled, assembling said half-links with a cubical block fitted between said inward projections with a double-V welding groove in said block registering with the grooves between the end faces of the half-links to form a substantially continuous double-V groove extending across the assembly between the extremities of the outward projections, welding the parts together by depositing in said continuous groove sufficient fused filled metal to fill the groove, and cutting off said outward projections.

6. A method of making stud chain links, which comprises making a pair of half-links each having its end portions enlarged in the plane of the half-link to form inward projections which abut each other and outward projections beyond the normal contour of the link, forming beveled end faces on said enlarged end portions, assembling said half-links with said end faces opposed to form a substantially continuous welding groove extending across the assembly, welding the parts together by depositing in said groove sufficient fused filler material to fill the groove, and cutting off the outward projections.

7. A method of making stud chain links, which comprises making two half-links with beveled end faces, assembling said half-links ends to ends so that the opposed beveled end faces form welding grooves, assembling with said half-links an inner block having a welding groove registering with the welding grooves between said opposed end faces, assembling with said half-links and inner block a pair of outer blocks with welding grooves alined with the welding grooves between said end faces to form extensions thereof, welding said half-links and blocks into an integral unit by filling the composite welding groove with filler metal, and cutting off the outer blocks.

8. A method of making a shot of stud-link chain, which comprises making a quantity of units each consisting of a whole link and a pair of half-links linked into the respective ends of the whole link, each said half-link having outward and inward lateral projections on its end portions and beveled end faces extending substantially continuously across the half-link, assembling said units together in series with the end faces of each half-link placed in opposition to the end faces of a half-link of the next unit, arranging the pairs of juxtaposed half-links side by side with their outward projections touching so that the opposed beveled end faces of all of the half-links form a substantially continuous welding groove, running a continuous weld to fill said groove, and cutting away the outward projections from the links thus formed.

9. A half-link comprising a U-shaped member having an outward and an inward projection in the plane of the U at each end thereof, said inward projections extending toward each other and being spaced by a distance slightly greater than the wire diameter of said member, the ends of said member having beveled end faces which are mutually alined.

10. A half-link comprising a U-shaped member having an outward and an inward projection in the plane of the U at each end thereof, said inward projections extending toward each other and being substantially in contact, the ends of said member with their projections having beveled end faces which are mutually alined and extend substantially continuously across the half-link.

11. A method of making chain links, which comprises forming a pair of half-links each having end portions widened to form inward projections in the plane of the link, the end faces of the half-links being beveled to form welding grooves when the half-links are assembled together ends to ends, forming a block adapted to fit between the inward projections of the assembled half-links with a groove registering with the grooves between the ends of the half-links, assembling said half-links and block to form a stud link, and welding the parts together by depositing in the groove between the ends and in the block sufficient fused filler metal to fill the groove.

12. A method of making stud chain links, which comprises forming parts for stud links, said parts including half-links with end faces beveled to form welding grooves when a pair of half-links are placed ends to ends, assembling said parts to form a series of discrete links arranged side by side with grooved spacing elements between successive links forming a substantially continuous welding groove transversely bisecting all said links, running a continuous weld to fill said groove from one end to the other thereof, and cutting away from said links the spacing elements between them.

13. A method of making stud chain links, which comprises making a number of half-links having their end portions upset to form inward and outward projections and to present a substantially continuous beveled end face extending transversely of the half-links between the extremities of the outward projections, assembling pairs of half-links to form a series of discrete links arranged side by side with the outward projections of successive links touching and the beveled end faces forming a substantially continuous welding groove bisecting all said links, running a continuous weld to fill said groove from end to end, and cutting off the outward projections from the several links.

CARLTON G. LUTTS.
ALBERT M. LEAHY.